US012776961B2

(12) United States Patent
Lei et al.

(10) Patent No.: US 12,776,961 B2
(45) Date of Patent: Oct. 27, 2026

(54) CLOUD ARCHITECT

(71) Applicant: Microsoft Technology Licensing, LLC, Redmond, WA (US)

(72) Inventors: Belinda Lei, Los Angeles, CA (US); Qasim Ijaz, Atlanta, GA (US); Sandeep Gusain, Alpharetta, GA (US); Shi Cheng, Dunwoody, GA (US); Vijaya Lakshmi Sri Pallavi Damera, Redmond, WA (US); Ross James Lordon, Seattle, WA (US); Fan Mai, Bellevue, WA (US); Julia Anne Cheng, Issaquah, WA (US); Rui Wu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 18/428,698

(22) Filed: Jan. 31, 2024

(65) Prior Publication Data

US 2025/0247303 A1 Jul. 31, 2025

(51) Int. Cl.
*H04L 41/16* (2022.01)
*G06F 16/9038* (2019.01)
(Continued)

(52) U.S. Cl.
CPC .......... *H04L 41/16* (2013.01); *G06F 16/9038* (2019.01); *G06F 40/40* (2020.01);
(Continued)

(58) Field of Classification Search
CPC ..... H04L 41/16; H04L 41/04; H04L 41/0806; H04L 41/084; H04L 41/22; G06F 16/9038; G06F 40/40
(Continued)

(56) References Cited

U.S. PATENT DOCUMENTS 10,497,367 B2 * 12/2019 Levit ........................ G06F 40/30
12,032,918 B1 * 7/2024 Garvey .................. G06F 40/40
(Continued)

OTHER PUBLICATIONS

"Microsoft Cloud Adoption Framework for Azure", Retrieved from: https://learn.microsoft.com/en-us/azure/cloud-adoption-framework/, Retrieved on: Jun. 10, 2025, 2 Pages.
(Continued)

*Primary Examiner* — Karen C Tang
(74) *Attorney, Agent, or Firm* — Ray Quinney & Nebeker P.C.; James Bullough

(57) ABSTRACT

A cloud architect guides cloud architecture design and deployment for users of all skill levels. Generative artificial intelligence (AI) interprets user specifications to provide architectural diagrams for a wide variety of application scenarios. A cloud architect generates search results responsive to a request for a cloud architecture. The search results indicate at least one example cloud architectural diagram. The cloud architect generates a request to a large language model (LLM) for a recommended cloud architecture based on the user request and the search results. The cloud architect receives a response generated by the LLM indicating at least one recommended cloud architecture. The cloud architect provides an interactive LLM response. The cloud architect enables selection of a recommended cloud architectural diagram, e.g., for deployment, manual editing, or dialog leading to automated customization. The cloud architect deploys a workload to a cloud using cloud resources determined based on the selected diagram.

20 Claims, 5 Drawing Sheets

(51) Int. Cl.

| | |
|---|---|
| ***G06F 40/40*** | (2020.01) |
| ***H04L 41/04*** | (2022.01) |
| ***H04L 41/0806*** | (2022.01) |
| ***H04L 41/084*** | (2022.01) |
| ***H04L 41/22*** | (2022.01) |

(52) U.S. Cl.
CPC .......... *H04L 41/04* (2013.01); *H04L 41/0806* (2013.01); *H04L 41/084* (2013.01); *H04L 41/22* (2013.01)

(58) Field of Classification Search
USPC ........................................................... 709/224
See application file for complete search history.

(56) References Cited

U.S. PATENT DOCUMENTS

| | | | | |
|---|---|---|---|---|
| 2020/0106666 | A1* | 4/2020 | Purushothaman | G06F 8/71 |
| 2021/0157854 | A1* | 5/2021 | Wang | G06F 16/93 |
| 2021/0157857 | A1* | 5/2021 | Nogueira Dos Santos | G06N 20/00 |
| 2024/0111263 | A1* | 4/2024 | Namburi | H04L 67/34 |
| 2024/0256764 | A1* | 8/2024 | Maschmeyer | G06F 16/3328 |
| 2024/0275674 | A1* | 8/2024 | Page | H04L 67/10 |
| 2024/0289361 | A1* | 8/2024 | Batina | G06F 16/3328 |
| 2024/0419907 | A1* | 12/2024 | Laprise | G01C 21/34 |
| 2025/0007870 | A1* | 1/2025 | Kim | G06F 9/541 |
| 2025/0156651 | A1* | 5/2025 | Zhuo | G06F 16/954 |
| 2025/0181847 | A1* | 6/2025 | Schüller | G06F 40/30 |
| 2025/0190470 | A1* | 6/2025 | Khullar | G06F 16/3347 |
| 2025/0217214 | A1* | 7/2025 | Kashyap | G06F 3/0484 |
| 2025/0244972 | A1* | 7/2025 | Saragadam | G06F 40/40 |

OTHER PUBLICATIONS

"Quick and easy video editor", Retrieved from: https://clipchamp.com/en/, Reterived on: Jun. 10, 2025, 9 Pages.

"Quickstart: Chat with Azure OpenAI models using your own data", Retrieved from: https://learn.microsoft.com/en-us/azure/ai-services/openai/use-your-data-quickstart?tabs=keyless%2Ctypescript-keyless%2Cpython-new&pivots=ai-foundry-portal, Apr. 29, 2025, 8 Pages.

* cited by examiner

CLOUD ARCHITECT

BACKGROUND

"Cloud computing" refers to the on-demand availability of computer system resources (e.g., applications, services, processors, storage devices, file systems, and databases) over the Internet and data stored in cloud storage. Servers hosting cloud-based resources may be referred to as "cloud-based servers" (or "cloud servers"). A "cloud computing service" refers to an administrative service (implemented in hardware that executes in software and/or firmware) that manages a set of cloud computing computer system resources.

Cloud computing platforms include quantities of cloud servers, cloud storage, and further cloud computing resources that are managed by a cloud computing service. Cloud computing platforms offer higher efficiency, greater flexibility, lower costs, and better performance for applications and services relative to "on-premises" servers and storage. Accordingly, users are shifting away from locally maintaining applications, services, and data and migrating to cloud computing platforms. One of the pillars of cloud services are compute resources, which are used to execute code, run applications, and/or run workloads in a cloud computing platform. Such compute resources may be made available to users in sets, also referred to as "clusters."

A cloud architecture is a representation of the systems architecture of the hardware and software systems involved in the delivery of cloud computing, typically involving multiple cloud resources communicating with each other over a network. Computing devices may be used to generate a cloud architecture that includes cloud resources for a particular application.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods are disclosed herein for a cloud architect that provides guided support for cloud architecture design and deployment for users of all skill levels. A cloud architect combines comprehensive cloud architecture knowledge, diagramming tools, AI-powered large language model (LLM) dialog, image generation, and deployment template creation within a single platform. Generative artificial intelligence (AI) interprets user specifications to provide customized architectural solutions based on information including an architectural diagram and application scenario information, which may be stored in one or more databases. The cloud architect can deploy workloads with end-to-end support or workloads may be exported. Cloud architect automation decreases the time and expertise to migrate to cloud computing, reducing business expenses. A cloud architect enhances resource utilization and reduces waste, leading to cost savings and improved scalability without manual intervention. A cloud architect can be configured to confirm configuration accuracy, perform automated updates for cloud architectures based on updates to cloud environment (e.g., cloud infrastructure or resources), perform regulatory compliance management, perform data security, perform scaling, and/or perform optimization.

In aspects, a computing system includes a cloud architect configured to generate search results responsive to a request for a cloud architecture, the search results indicating at least one example cloud architectural diagram. The cloud architect generates a request to a large language model (LLM) for a recommended cloud architecture based on the user request and the search results. The cloud architect receives a response generated by the LLM indicating at least one recommended cloud architecture. The cloud architect provides the response for review in response to the user request. The cloud architect enables selection of a recommended cloud architectural diagram from the at least one recommended cloud architecture. The cloud architect enables editing of the selected recommended cloud architectural diagram. The cloud architect deploys a workload to a cloud using cloud resources determined based on the selected recommended cloud architectural diagram.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
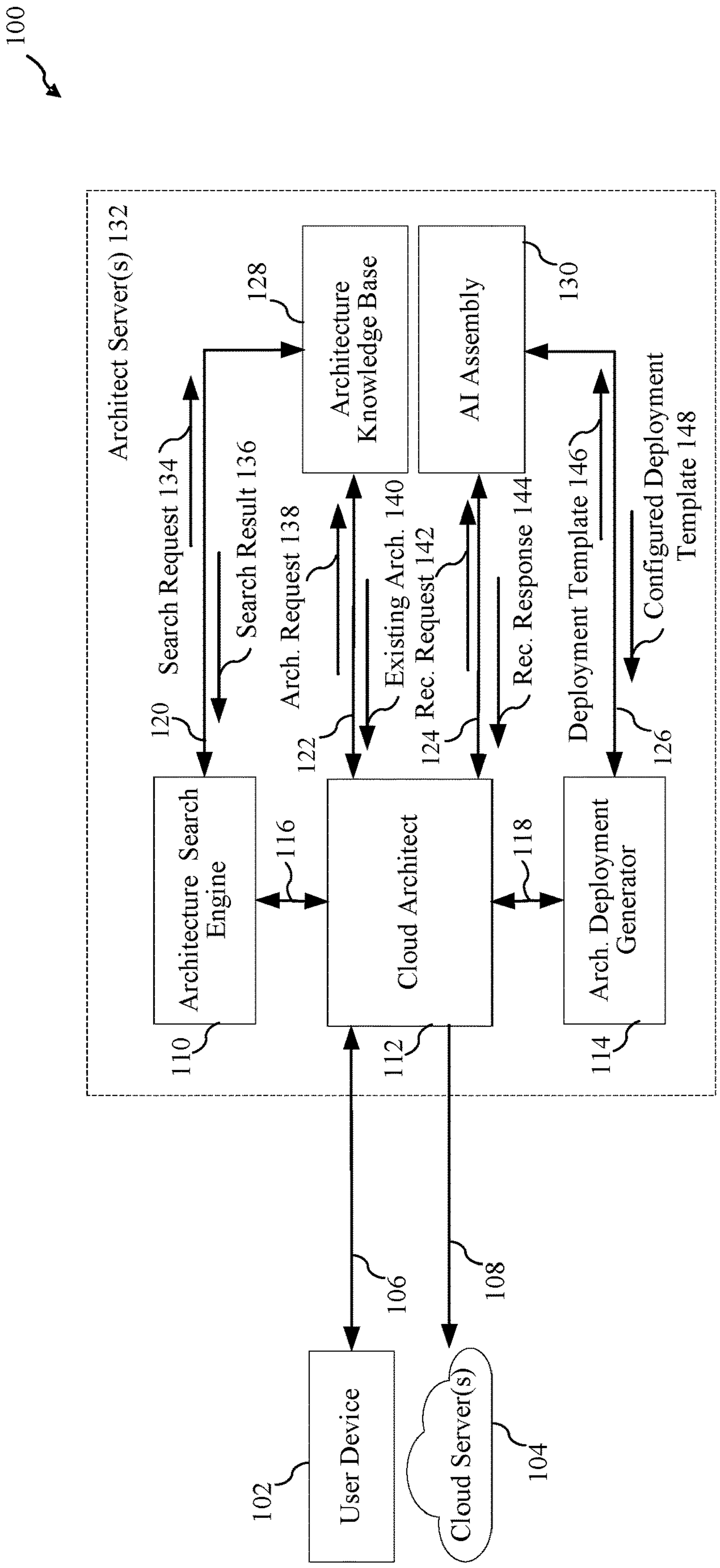
FIG. 1 shows a block diagram of a cloud architecture configuration system configured to provide a cloud architect for cloud architecture generation, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

A cloud architecture is a representation of the systems architecture of the hardware and software systems involved in the delivery of cloud computing, typically involving multiple cloud resources communicating with each other over a network. Computing devices may be used to access other computing devices, such as cloud servers, to generate cloud architecture using cloud resources. Cloud platforms, however, pose a challenge for many people due to their inherent complexity, often overwhelming users and making the selection of the right components and configurations a daunting task. Cloud users may spend a significant amount of time reading through documentation and relying on guesswork to identify the best solution for their particular scenario. The skills and knowledge gap may lead to costly solutions that outsource architecture to consultants and/or suboptimal setups for many companies with cloud needs.

As such, systems and methods are disclosed herein for a cloud architect that provides guided support for cloud architecture design and deployment for users of all skill levels. A cloud architect combines comprehensive cloud architecture knowledge, diagramming tools, AI-powered large language model (LLM) dialog, image generation, and deployment template creation within a single platform. Generative artificial intelligence (AI) interprets user specifications to provide customized architectural solutions based on information including an architectural diagram and application scenario information, which may be stored in one or more databases. Cloud architect can deploy workloads in end-to-end support or workloads may be exported.

In aspects, a computing system includes a cloud architect configured to generate search results responsive to a request for a cloud architecture, the search results indicating at least one example cloud architectural diagram. The cloud architect generates a request to a large language model (LLM) for a recommended cloud architecture based on the user request and the search results. The cloud architect receives a response generated by the LLM indicating at least one recommended cloud architecture. The cloud architect provides the response for review in response to the user request. The cloud architect enables selection of a recommended cloud architectural diagram from the at least one recommended cloud architecture. The cloud architect enables editing of the selected recommended cloud architectural diagram. The cloud architect deploys a workload to a cloud using cloud resources determined based on the selected recommended cloud architectural diagram. Furthermore, the cloud architect is enabled to learn from feedback to improve recommendations of cloud architectural diagrams.

Embodiments have numerous advantages. For instance, cloud architect automation decreases the time and expertise to migrate to cloud computing, reducing business expenses. A cloud architect enhances resource utilization and reduces waste, leading to cost savings and improved scalability without manual intervention. A cloud architect can be configured to confirm configuration accuracy, perform automated updates for cloud architectures based on updates to cloud environment (e.g., cloud infrastructure or resources), perform regulatory compliance management, perform data security, perform scaling, and/or perform optimization.

These and further embodiments may be implemented in various ways. For instance, FIG. 1 shows a block diagram of a system 100 configured for cloud architecture generation, in accordance with an embodiment. Example system 100 includes a user device 102, one or more cloud servers 104, and one or more architect servers 132. Architect server(s) 132 includes a cloud architect 112, an architecture search engine 110, an architecture deployment generator 114, an architecture knowledge base 128, and an artificial intelligence (AI) assembly 130. These components of system 100 are described in further detail as follows.

User device 102 is a computing device utilized by one or more users (e.g., individual users, family users, enterprise users, governmental users, administrators, etc.). User device 102 may comprise one or more applications, operating systems, virtual machines (VMs), storage devices, etc., that may be executed, hosted, and/or stored therein or via one or more other computing devices (e.g., second computing device(s) 102) via network(s) (not shown). In an example, user device 102 may access cloud architect 112 on one or more server devices. User device 102 may be any type of stationary or mobile computing device, including a mobile computer or mobile computing device (e.g., a personal digital assistant (PDA), a laptop computer, a notebook computer, a tablet computer, a netbook, etc.), a mobile phone, a wearable computing device, or other type of mobile device, or a stationary computing device such as a desktop computer or PC (personal computer), or a server. User device 102 is not limited to physical machines, but may include other types of machines or nodes, such as a virtual machine, that are executed in physical machines. An example computing device with example features is presented in FIG. 6.

User device 102 may operate in one or more computing environments and may execute one or more processes in such computing environments. A process is any type of executable (e.g., binary, program, application) that is being executed by a computing device. A computing environment may be any environment in which one or more computing devices may operate and interact, including a client-server system, a multi-computer network, etc. User device 102 may execute a browser application, which may execute code (e.g., using a JavaScript engine) to display remote content (e.g., content generated by other computing devices), such as webpages, web applications (web apps), which may have user interfaces (e.g., graphical user interfaces (GUIs)) that user(s) interact with. A browser application may be configured to communicate with one or more applications executed by server(s), such as cloud architect 112. For example, a remote content GUI displayed by a browser may send and receive messages for architecture dialog 106 between user device 102 and cloud architect 112.

A user may use user device 102 to communicate with cloud architect 112 to look at cloud architectures, send one or more cloud architectures (e.g., cloud architectural diagrams) to cloud architect 112 (e.g., to provide to AI assembly 130 as a recommended architecture diagram), engage in a dialog to determine a cloud architecture to implement on cloud server(s) 104, deploy or export a cloud architecture, etc. In various implementations, many users may simultaneously use many user devices 102 to interact with cloud architect 112.

Network(s), not shown, may include, for example, one or more of any of a local area network (LAN), a wide area network (WAN), a personal area network (PAN), a combination of communication networks, such as the Internet, and/or a virtual network. With reference to FIG. 1, user device 102, cloud server(s) 104, and architect server(s) 132 may be communicatively coupled via network(s). In an implementation, user device 102, architect server(s) 132, and cloud server(s) 104 may communicate via one or more application programming interfaces (APIs), and/or according to other interfaces and/or techniques. User device 102, architect server(s) 132, and cloud server(s) 104 may include one or more network interfaces that enable communications between devices.

Cloud server(s) 104 may comprise one or more computing devices, servers, services, local processes, remote machines, web services, etc. Cloud server(s) 104 may be any type of stationary or mobile computing device. In an example, cloud server(s) 104 may comprise a cloud-based server (e.g., one or more servers in a distributed manner), or any other device or service that may host, manage, and/or provide resource(s) for cloud workload deployment services. Cloud server(s) 104 may be implemented as a plurality of programs executed by one or more computing devices. Cloud server(s) 104 is not limited to physical machines, but may include other types of machines or nodes, such as a virtual machine, that are executed in physical machines.

Architect server(s) 132 may comprise one or more computing devices, servers, services, local processes, remote machines, web services, etc. Architect server(s) 132 may be any type of stationary or mobile computing device. In an example, architect server(s) 132 may comprise a remotely located (e.g., third party) server, a cloud-based server (e.g., one or more servers in a distributed manner), or any other device or service that may host, manage, and/or provide resource(s) for cloud architect design and deployment services. Architect server(s) 132 may be implemented as a plurality of programs executed by one or more computing devices. Architect server(s) 132 is not limited to physical machines, but may include other types of machines or nodes, such as a virtual machine, that are executed in physical machines.

Cloud architect 112 is configured to interface with user device 102. For instance, cloud architect 112 may engage in a cloud architecture dialog 106 with user device 102. Cloud architect 112 may be implemented, for example, as a website or a Web App. An architecture dialog 106 may include, for example, an architecture specification, questions and answers about a cloud architecture, an architecture search query, architecture search results, architecture diagrams in search results, descriptions of architecture diagrams, recommended architecture diagrams, user selections (e.g., selected architecture), user edits, user refinements, deployment template, exported deployment, etc.

Cloud architect 112 includes or utilizes artificial intelligence (AI), such as generative AI, which may utilize a large language model (LLM), to engage in architecture dialog 106 with user device 102. For instance, cloud architect 112 may be configured to present a cloud architect tool (e.g., a graphical user interface) in response to user selection of a cloud architect tool or service shown as one of multiple cloud-related services or tools available to users who access cloud services.

Cloud architect 112 may be configured to prompt a user to create a cloud architecture from an existing diagram or from scratch. For example, cloud architect 112 may request 138 the user's existing cloud architecture(s) (e.g., drafts or published/implemented) by communicating 122 with architecture knowledge base 128. Cloud architect 112 may present the user's existing architecture(s) 140 as selectable. Cloud architect 112 may prompt the user to indicate whether the user wants to select an existing architecture or a new architecture.

Cloud architect 112 is configured to engage in architecture dialog 106, such as a natural language chat. Architectural dialog 106 may include textual prompts and/or selectable suggestions responsive to user input. For example, cloud architect 112 may provide a text box for a user to type or paste in a variety of specifications, questions, or other information. Cloud architect 112 may provide one or more selectable prompts, such as "create an architecture from scratch," "build from an architecture template," "I don't know where to start," etc. A user may select a prompt or type or paste specifications to communicate with cloud architect 112. Cloud architect 112 may accumulate prompts (e.g., questions) and answers, for example, to build or formulate a cloud architecture search query. For example, cloud architect 112 may provide selections for a user, such as "set up a CI/CD architecture diagram," "set up an application architecture diagram," "set up devops architecture diagram," etc. A user may enter text, such as "I need to migrate my existing web app from a legacy system to the cloud and implement a CI/CD pipeline for faster and more reliable deployments." Cloud architect 112 may respond, "There are many options for CI/CD. Do you have any specific goals, requirements, and/or constraints for your architecture?" and provide one or more selectable responses, such as "I have security and compliance requirements," "I have scalability requirements," "I have cost requirements." The user may respond, "I want it to be simple, scalable, consistent, and secure."

Cloud architect 112 may be configured to generate a user request from information received during a user dialog with the AI. Cloud architect 112 may be configured to accumulate, parse, and combine information in the context in which it was received to formulate a cloud architecture search request. For example, a user could provide an architecture specification in a text box, by attaching a document, or by engaging in a question and answer dialog to indicate an architecture specification that forms the foundation of a search request. For example, cloud architect 112 may create the following search request with terms and phrases based on architecture dialog 106: migrate web app, CI/CD pipeline, simple, scalable, consistent, and secure.

Cloud architect 112 may be configured to perform an architecture search of architecture knowledge using the search request. Cloud architect 112 may provide the search request as search request 134 in a communication 116 with architectural search engine 110. Architectural search engine 110 may scan and index architecture knowledge base 128 for fast search results. Architectural search engine 110 may use the architectural search request 134 to search one or more indexes associated with information stored in architecture knowledge base 128 and obtain the indexed information as an architectural search result 136 received from architecture knowledge base 128 via communication 120.

Architecture knowledge base 128 may include physical storage that includes memory and/or storage device(s), including, for example, one or more of RAM (random access memory), ROM (read only memory), flash memory, a solid-state drive (SSD), a hard disk drive, and/or other physical memory device type.

Architecture knowledge base 128 is a body of knowledge represented in electronic form usable by cloud architect 112 and architectural search engine 110. For instance, architecture knowledge base 128 may store cloud architecture information representative of one or more cloud architectures that each include nodes (e.g., computers, servers, storage devices, processors, virtual machines, applications, etc.) interconnected (e.g., by wired and/or wireless connections) in a cloud-based network. Architecture knowledge base 128 may store cloud architecture information (e.g., as text, diagrams, and other information) in any suitable form, including documents, files, images, tables, etc. In some embodiments, architectural knowledge base 128 may store such information in an ontology (e.g., a set of objects, relations, concepts, and/or properties associated with a particular knowledge domain). Cloud architecture information may include information about resource utilization, component connections, communications between components, virtual machines (VMs), servers, data flows, etc. Cloud architecture information may be indexed for searching, for example, through association with one or more query terms or phrases, which may include the type of architecture, use scenarios, and a wide variety of other terms of phrases that define and distinguish between cloud architectures.

Cloud architect 112 is configured to receive architectural search result 136 from architecture search engine 110 as in communication 116. Architecture search results may include a variety of information in one or more formats, e.g., text, figure information in one or more drawing file formats, and so on. Text may describe, for example, the flow of data in the diagram, various application or deployment scenarios, and so on.

Cloud architect 112 may be configured to generate an artificial intelligence (AI) request for a recommended cloud architecture based on the user request and the search results. Cloud architect 112 may be configured to arrange information within the request and results in the AI architecture request in a format expected by AI assembly 130. The AI architecture request may include the search request and search result, which may include text, diagram information (e.g., drawing files), and so on. The AI architecture request may include information about at least one architecture diagram obtained in architecture search request and/or provided by a user in architecture dialog 106. Cloud architect 112 may provide the AI architecture request to AI assembly 130 in recommendation request 142 transmitted as communication 124. Various recommendations may be based on various factors indicated by a user, such as performance, cost, availability, reliability, security, and so on.

AI assembly 130 may include generative AI that engages in architecture dialog 106 with user device 102. For instance, AI assembly 130 may include a large language model (LLM) that provides text that the generative AI uses to engage in dialog.

In response to a recommendation request 142 transmitted by cloud architect 112, cloud architect 112 may receive from AI assembly 130 in communication 124 an AI generated recommendation response 144 indicating at least one recommended cloud architecture. The recommended cloud architecture(s) may include one or more original or modified versions of the cloud architecture(s) provided in the AI architecture request. The recommended cloud architecture(s) may be accompanied by associated text, such as data flow descriptions, successfully deployed uses, and so on. The LLM may be configured to generate both editable images (e.g., of cloud architectures) from those passed in from search engine results and new images from scratch with the associated text.

Cloud architect 112 may be configured to provide the AI generated response for review by the user as a response to the user's request for a cloud architecture. Cloud architect 112 may provide the AI generated response to user device 102 in architecture dialog 106. For example, the AI generated response may present two diagrams, associated descriptions and costs. The AI generated response may state, for example, "OK, there are two options for your CI/CD architecture diagram: push-based or pull-based. The push-based option includes a source code repository that pushes the changes to the target environment, such as an app service. While a push-based approach may in some circumstances be simpler and faster than a pull-based approach, there may be inconsistencies. The pull-based option includes a target environment that pulls changes from the source code repository. While pull-based approaches can be more reliable and consistent, they may utilize more configuration and resources, resulting in a higher cost." The AI generated response may be presented with links to reference documents associated with the diagram(s), such as description of deployment scenarios, components, operation, dataflow, etc., Cloud architect 112 may be configured to enable selection of a recommended cloud architectural diagram from the at least one recommended cloud architecture of AI generated recommendation response 144. For example, the AI generated response may be provided with an indication for the user to select any of the diagrams presented, e.g., for purposes of enlargement, review in association with textual description of components, operation, dataflow, etc., or for purposes of deployment, editing, refinement via one or more iterations of further dialog, saving for reference, and so on.

Cloud architect 112 may be configured to enable editing a recommended cloud architectural diagram from the at least one recommended cloud architectural diagram. For example, the AI generated response may be presented so that a user may select a diagram to open in an editor. A user may, for example, right click to see a pop up window, and scroll to select open the diagram in an editor consistent with the format of the diagram. The diagram may open in an editor with options for the user to perform all or a subset of editing operations.

A user may request that cloud architect 112 perform one or more operations for a selected or edited architecture diagram, such as save, export, check configuration accuracy, regulatory compliance, data security, scaling, optimization, cost saving alternatives, make recommendations, deploy, etc. For example, cloud architect 112 may be configured to deploy a workload to a cloud using cloud resources based on the selected recommended cloud architectural diagram.

For example, cloud architect 112 may enable further dialog based on user review of diagram(s). Cloud architect 112 may receive an updated response from a user during further dialog. Cloud architect 112 may generate another (e.g., refined) search request that results in presenting a further (e.g., refined) AI architecture response to user device 102, which may occur as part of continuing architecture dialog 106.

Cloud architect 112 may receive an edit request to edit the selected recommended cloud architectural diagram. Cloud architect 112 may edit (e.g., customize) the selected recommended cloud architecture diagram in response to the edit request. Cloud architect 112 may provide the edited selected recommended cloud architectural diagram for review in response to the edit request. An automated editing option supports a wider range of users.

Cloud architect 112 deploys a workload to a cloud using cloud resources determined based on the selected recommended cloud architectural diagram. For example, as shown in FIG. 1, cloud architect 112 may provide an architecture specification to architecture deployment generator 114 in communication 118 based on the recommended cloud may select a deployment template 146 based on the received specification. Architecture deployment generator 114 may the architecture specification to AI assembly 130 in communication 126. AI assembly 130 may be multi-modal, capable of configuring a deployment template as well as engaging in architecture dialog and recommending architecture diagrams. In response, AI assembly 130 configures the template and provides a configured template 148 to architecture deployment generator 114 in communication 126. Architecture deployment generator 114 provides configured deployment template 148 to cloud architect 112 in communication 118. Cloud architect 112 receives the configured deployment template 148 responsive to the architecture specification. Cloud architect 112 may deploy (actually deploy or cause to be deployed) the workload based on configured deployment template 148. For example, cloud architect 112 may provide the deployment to cloud server(s) 104 in deployment communication 108. Cloud architect 112 may indicate to user device 102 the status of the deployment, such as "deployment has started," "the deployment is in progress," "the deployment is complete," "view deployed resources," and so on.

Cloud architect 112 may be configured to provide user device 102 with end-to-end support, from design to deployment. In some examples, user device 102 may request that an architecture diagram and/or a configured deployment template be exported to user device 102 in architecture dialog 106.

Figure 2:
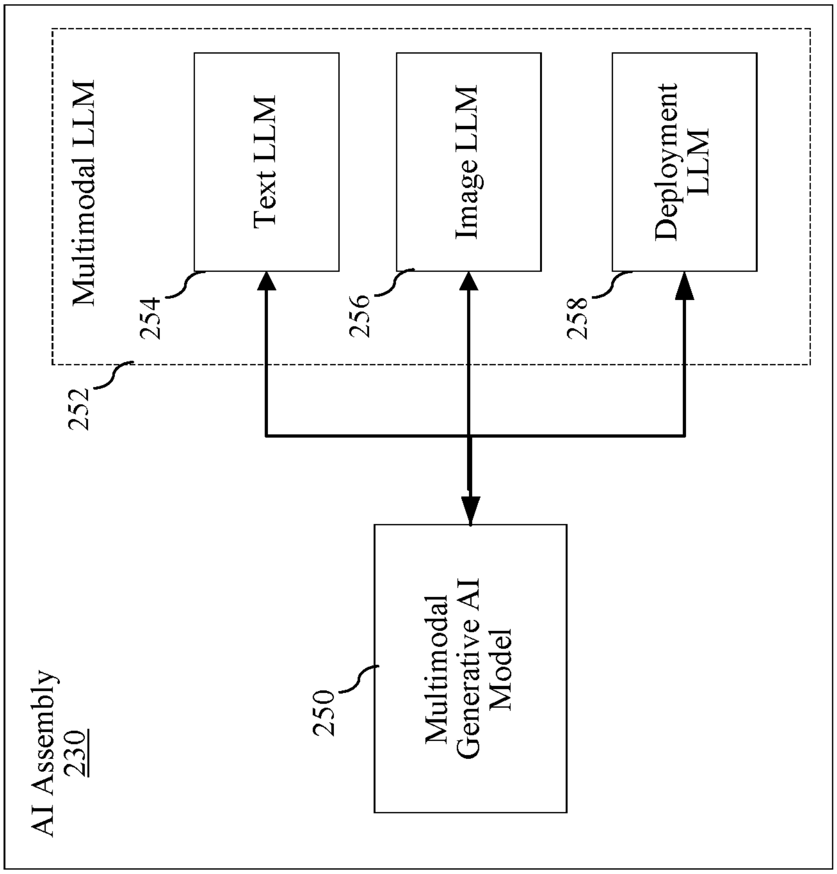
FIG. 2 shows a block diagram of an interactive multimodal artificial intelligence for a cloud architect, in accordance with an embodiment.

FIG. 2 shows a block diagram of an interactive multimodal artificial intelligence for a cloud architect, in accordance with an embodiment. In particular, FIG. 2 shows an AI assembly 230 that is an example of artificial intelligence (AI) 130 of FIG. 1. As shown in FIG. 2, AI assembly 230 may include, for example, a multimodal generative AI model 250 and a multimodal LLM 252, which may include a text LLM 254, an image LLM 256, and a deployment LLM 258.

AI assembly 230 may be multi-modal, with multiple modes of operation to perform multiple functions. For instance, AI assembly 230 may include multiple generative AI modes that interpret and generate text (e.g., architecture dialog, documents), images (e.g., architecture diagrams), deployment (e.g., template configurations), etc. AI assembly 230 may include one or more large language models (LLMs) for use by different generative AI modes to interpret and generate text, images, configurations, etc.

Multimodal generative AI model 250 is a multimodal generative AI model trained on suitable training data to receive queries regarding AI architectures and to respond with corresponding suitable information regarding cloud architectures. Multimodal generative AI model 250 may receive an indication or may detect which mode to use, e.g., text, image, configuration, and so on, to interpret input and generate output. Based thereon, multimodal generative AI model 250 may select the appropriate LLM in multimodal LLM 252, such as text LLM 254, image LLM 256, or deployment LLM 258. Each of text LLM 254, image LLM 256, or deployment LLM 258 is a machine learning model designed to generate human-like text for the corresponding textual, image, or deployment application. Each of LLMs 254, 256, and 258 are trained on large amounts of input data (e.g., text, diagrams, etc.) using a deep learning algorithm, which may involve reinforcement from human feedback, self-instruction, a mixture of experts, prompt engineering, etc. Each LLM may be generated and trained specifically for use in AI assembly 230, or may be an external available LLM (e.g., ChatGPT) leveraged (e.g., accessed) by AI assembly 130.

Multimodal generative AI model 250 may select text LLM 254 to engage in architecture dialog 106, e.g., in support of cloud architect 112 developing an architecture search request and AI architecture request. Multimodal generative AI model 250 may use text LLM 254 to engage in architecture dialog 106. Architecture dialog 106 may include, for example, an architecture specification, questions and answers about a cloud architecture, an architecture search query, architecture search results, architecture diagrams in search results, descriptions of architecture diagrams, recommended architecture diagrams, user selections (e.g., selected architecture), user edits, user refinements, deployment template, exported deployment, etc.

Multimodal generative AI model 250 may select text LLM 254 and image LLM 256 to process an AI architecture request that includes text and one or more architecture diagrams. Multimodal generative AI model 250 may use image LLM 256 to select and recommend to a user one or more architecture diagrams. Cloud architect 112 may be configured to receive from multimodal generative AI assembly 230 in communication 124 an AI generated response indicating at least one recommended cloud architecture. The recommended cloud architecture(s) may include one or more original or modified versions of the cloud architecture (s) provided in the AI architecture request selected using LLM 256. The recommended cloud architecture(s) may be accompanied by associated text, such as data flow descriptions, successfully deployed uses, and so on, which may be generated using text LLM 254.

Multimodal generative AI model 250 may select deployment LLM 258 to process an architecture specification received from architecture deployment generator 114. Multimodal generative AI model 250 may use deployment LLM 258 to configure the deployment template. Multimodal generative AI model 250 may provide the configured template to architecture deployment generator 114 in communication 126.

Figure 3:
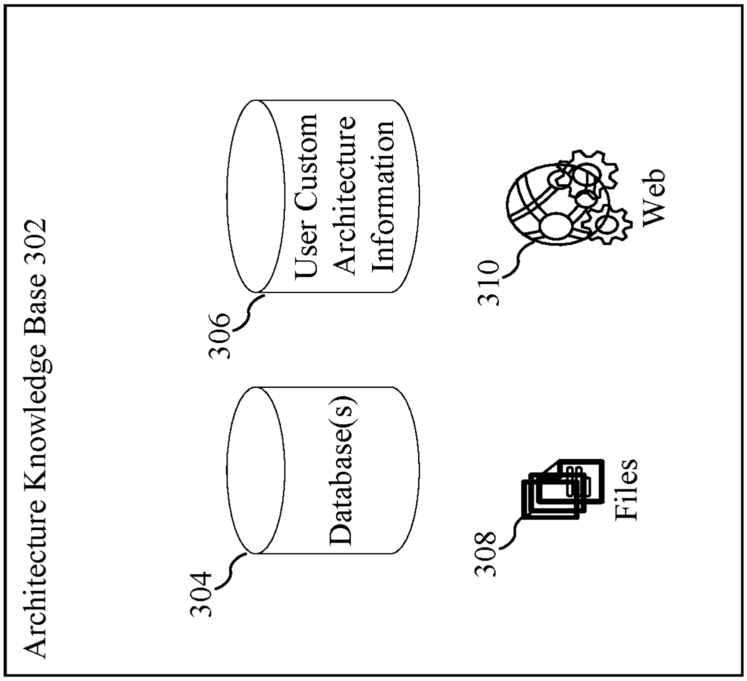
FIG. 3 shows a block diagram of architecture knowledge base for a cloud architect, in accordance with an embodiment.

FIG. 3 shows a block diagram of architecture knowledge for a cloud architect, in accordance with an embodiment. FIG. 2 shows an example architecture knowledge 302 for architecture knowledge base 128 shown in FIG. 1. Architecture knowledge 302 may include, for example, one or more databases 304, user custom architecture information 306, file-based information 308, and web-based information 310.

Database(s) 304 may include cloud architecture diagrams and associated documentation, such as application notes for a variety of application scenarios, description of components, operation, dataflow, etc., best practices for various fields, such as healthcare, banking, law, engineering, and so on. The database information stored in database(s) 304 may be available to users of a cloud service and/or publically available.

User custom architecture information 306 may include architectures that users have shown an interest in, such as by designing the architecture, selecting the architecture, saving the architecture, exporting the architecture, deploying the architecture, and so on. User custom architecture information 306 may include cloud architecture diagrams and associated documentation, such as application notes for a variety of scenarios, description of components, operation, dataflow, etc., best practices for various fields, such as healthcare, banking, law, engineering, and so on.

File-based information 308 may include cloud architecture information in file format, including cloud architecture diagrams and associated documentation, such as application notes for a variety of scenarios, description of components, operation, dataflow, etc., best practices for various fields, such as healthcare, banking, law, engineering, and so on.

Web-based information 310 may include cloud architecture information gleaned from the World Wide Web (WWW), including cloud architecture diagrams and associated documentation, such as application notes for a variety of scenarios, description of components, operation, dataflow, etc., best practices for various fields, such as healthcare, banking, law, engineering, and so on. Web-based information 310 may be available through searches using WWW search engines.

Database(s) 304, user custom architecture information 306, file-based information 308, and web-based information 310 may be periodically updated by architecture search engine 110. Database(s) 304, user custom architecture information 306, file-based information 308, and web-based information 310 may be indexed by architecture search engine 110 to perform searches responsive to architecture search requests from cloud architect 112.

Figure 4:
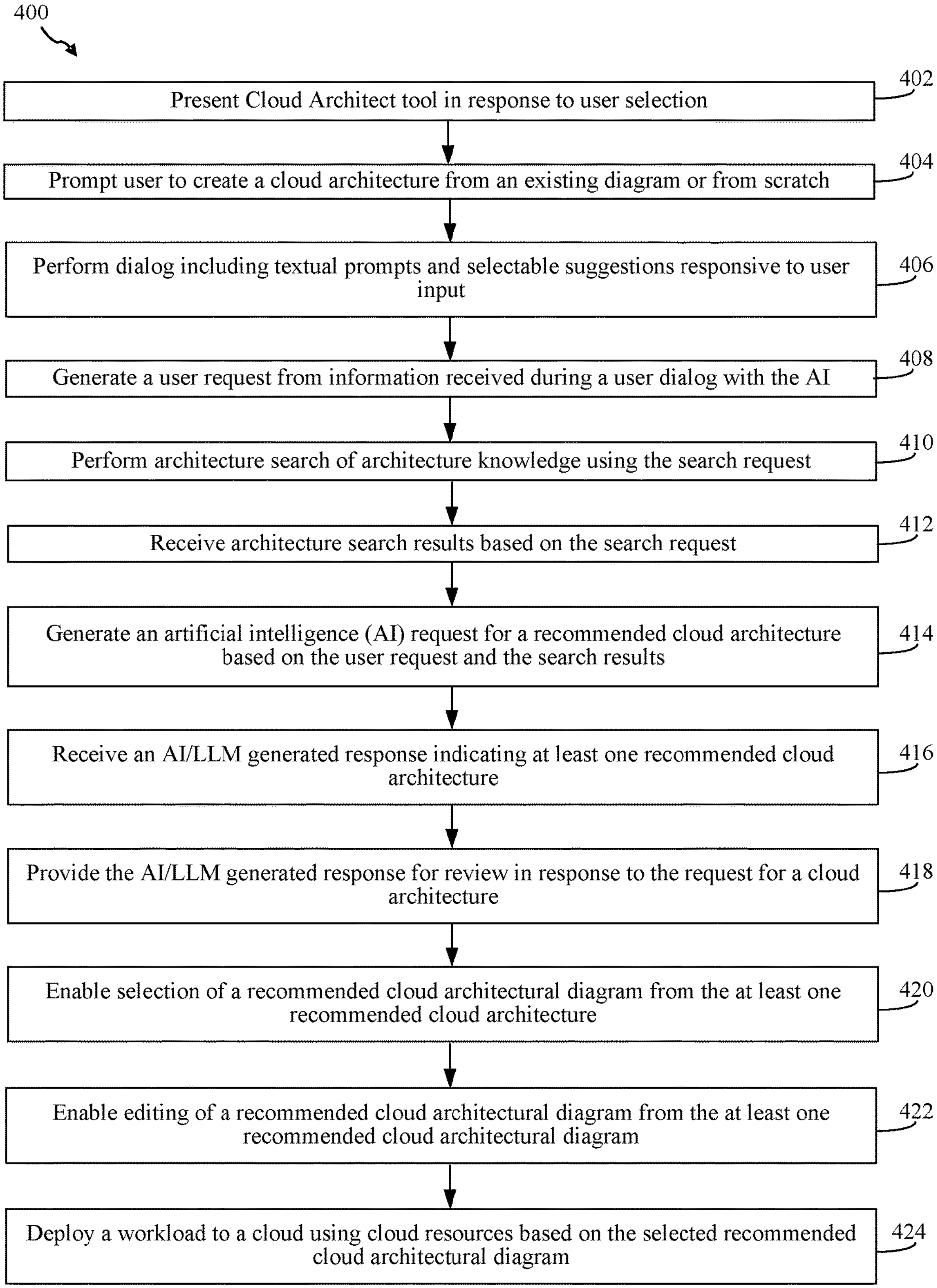
FIG. 4 shows a flowchart of a process for cloud architect design and deployment, according to an embodiment.

Embodiments described herein may operate in various ways. For instance, FIG. 4 shows a flowchart of a process for cloud architect design and deployment, according to an embodiment. Example computing system 100, as shown by examples in FIGS. 1-3, may operate according to interaction diagram 400, e.g., in some embodiments. For example, example interaction diagram 400 may be implemented by architect server(s) 132 or cloud architect 112. Various embodiments may implement one or more steps shown in FIG. 4 with additional and/or alternative steps. Further structural and operational embodiments will be apparent to persons skilled in the relevant art(s) based on the following description of FIG. 4.

Interaction diagram 400 includes step 402. In step 402, a cloud architect tool may be presented in response to user selection. For example, as shown in FIGS. 1-3, cloud architect 112 may be configured to present a cloud architect tool (e.g., a graphical user interface) in response to user selection of a cloud architect tool or service shown as one of multiple cloud-related services or tools available to users who access cloud services.

In step 404, a user may be prompted to create a cloud architecture from an existing diagram (e.g., the user may store, retrieve, and/or resume work on custom diagrams) or from scratch. For example, as shown in FIGS. 1-3, cloud architect 112 may be configured to prompt a user to create a cloud architecture from an existing diagram or from scratch. For example, cloud architect 112 may request the user's existing cloud architecture(s) (e.g., drafts or published/implemented) by communicating 122 with architecture knowledge base 128. Cloud architect 112 may present existing architecture(s) (e.g., uploaded by the user from a data source to architecture knowledge base 128) as selectable. Cloud architect 112 may prompt the user to indicate whether the user wants to select an existing architecture or a new architecture.

In step 406, a dialog (e.g., chat) may be performed, including textual prompts and selectable suggestions responsive to user input. For example, as shown in FIGS. 1-3, cloud architect 112 may be configured to engage in architecture dialog 106, such as a natural language chat. Architectural dialog 106 may include textual prompts and/or selectable suggestions responsive to user input. For example, cloud architect 112 may provide a text box for a user to type or paste in a variety of specifications, questions, or other information. Cloud architect 112 may provide one or more selectable prompts, such as "create an architecture from scratch," "build from an architecture template," "I don't know where to start," etc. A user may select a prompt or type or paste specifications to communicate with cloud architect 112. Cloud architect 112 may accumulate prompts (e.g., questions) and answers, for example, to build or formulate a cloud architecture search query.

In step 408, a user request may be generated from information received during a user dialog with the AI. For example, as shown in FIGS. 1-3, cloud architect 112 may be configured to generate a user request from information received during a user dialog with the AI. Cloud architect 112 may be configured to accumulate, parse, and combine information in the context in which it was received to formulate a cloud architecture search request. For example, a user could provide an architecture specification in a text box, by attaching a document, or by engaging in a question and answer dialog to indicate an architecture specification that forms the foundation of a search request.

In step 410, an architecture search of architecture knowledge may be performed using the search request. For example, as shown in FIGS. 1-3, cloud architect 112 may be configured to perform an architecture search of architecture knowledge using the search request. Cloud architect 112 may provide the search request in a communication 116 with architectural search engine 110. Architectural search engine 110 may use the architectural search request to search one or more indexes associated with information stored in architecture knowledge base 128 and obtain the indexed information as an architectural search result from architecture knowledge base 128 via communication 120.

In step 412, architecture search results based on the search request may be received. For example, as shown in FIGS. 1-3, cloud architect 112 may be configured to receive architecture search results from architecture search engine 110 in communication 116. Architecture search results may include a variety of information in one or more formats, e.g., text, figure information in one or more drawing file formats, and so on. Text may describe, for example, the flow of data in the diagram, various application or deployment scenarios, and so on.

In step 414, an artificial intelligence (AI) request may be generated for a recommended cloud architecture based on the user request and the search results. For example, as shown in FIGS. 1-3, cloud architect 112 may be configured to generate an artificial intelligence (AI) request for a recommended cloud architecture based on the user request and the search results. Cloud architect 112 may be configured to arrange information within the request and results in the AI architecture request in a format expected by AI assembly 130. The AI architecture request may include the search request and search result, which may include text, diagram information (e.g., drawing files), and so on. The AI architecture request may include information about at least one architecture diagram obtained in architecture search request and/or provided by a user in architecture dialog 106. Cloud architect 112 may provide the AI architecture request to AI assembly 130 in communication 124.

In step 416, an AI generated response indicating at least one recommended cloud architecture may be received. For example, as shown in FIGS. 1-3, cloud architect 112 may be configured to receive from AI assembly 130 in communication 124 an AI generated response indicating at least one recommended cloud architecture. The recommended cloud architecture(s) may include one or more original or modified versions of the cloud architecture(s) provided in the AI architecture request. The recommended cloud architecture(s) may be accompanied by diagrams, associated text, such as data flow descriptions, successfully deployed uses, and so on.

In step 418, the AI generated response may be provided for review in response to the request for a cloud architecture. For example, as shown in FIGS. 1-3, cloud architect 112 may be configured to provide the AI generated response for review by the user as a response to the user's request for a cloud architecture. Cloud architect 112 may provide the AI generated response to user device 102 in architecture dialog 106. For example, the AI generated response may present two diagrams, associated descriptions and costs. The AI generated response may state, for example, "OK, there are two options for your CI/CD architecture diagram: push-based or pull-based. The push-based option includes a source code repository that pushes the changes to the target environment, such as an app service. While a push-based approach is simpler and faster than a pull-based approach, there may be inconsistencies. The pull-based option includes a target environment that pulls changes from the source code repository. While pull-based approaches are more reliable and consistent, they may utilize more configuration and resources, resulting in a higher cost." The AI generated response may be presented with links to reference documents associated with the diagram(s), such as description of deployment scenarios, components, operation, dataflow, etc., In step 420, selection of a recommended cloud architectural diagram from the at least one recommended cloud architecture may be enabled. For example, as shown in FIGS. 1-3, cloud architect 112 may be configured to enable selection of a recommended cloud architectural diagram from the at least one recommended cloud architecture. For example, the AI generated response may be provided with an indication for the user to select any of the diagrams presented, e.g., for purposes of enlargement, review in association with textual description of components, operation, dataflow, etc., or for purposes of deployment, editing, refinement via one or more iterations of further dialog, saving for reference, and so on.

In step 422, editing of a recommended cloud architectural diagram from the at least one recommended cloud architectural diagram may be enabled. For example, as shown in FIGS. 1-3, cloud architect 112 may be configured to enable editing the selected recommended cloud architectural diagram from the at least one recommended cloud architectural diagram. For example, the AI generated response may be presented so that a user may select a diagram to open in an editor. A user may, for example, right click to see a pop up window, and scroll to select open the diagram in an editor consistent with the format of the diagram. The diagram may open in an editor with options for the user to perform all or a subset of editing operations.

In step 424, a workload may be deployed to a cloud using cloud resources based on the selected recommended cloud architectural diagram. For example, as shown in FIGS. 1-3, cloud architect 112 may be configured to deploy a workload to a cloud using cloud resources determined based on the selected recommended cloud architectural diagram. For example, cloud architect 112 may provide an architecture specification to architecture deployment generator 114 in communication 118 based on the recommended cloud may select a template based on the received specification. Architecture deployment generator 114 may provide the deployment template to AI assembly 130 in communication 126. AI assembly 130 may be multi-modal, capable of configuring a deployment template as well as engaging in architecture dialog and recommending architecture diagrams. AI assembly 130 configures the template and provides the configured template to architecture deployment generator 114 in communication 126. Architecture deployment generator 114 provides the configured deployment template to cloud architect 112 in communication 118. Cloud architect 112 receives the configured deployment template responsive to the architecture specification. Cloud architect 112 may deploy the workload based on the configured deployment template. For example, cloud architect 112 may provide the deployment to cloud server(s) 104 in deployment communication 108. The cloud architecture represented in the configured deployment template may be deployed by cloud server(s) by assigning the indicated cloud resources (compute nodes, storage, virtual machines, applications, networking appliances, etc.) to the deployment, interconnecting the cloud resources as indicated in the template, and enabling access to the deployment by the appropriate user(s).

Figure 5:
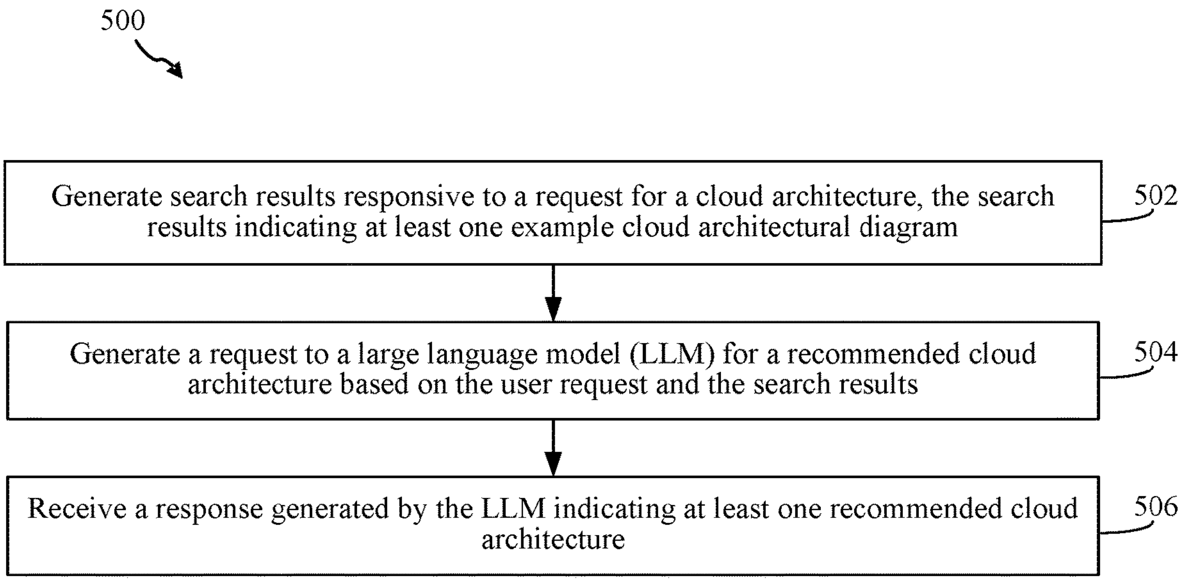
FIG. 5 shows a flowchart of a process for a cloud architect, according to an embodiment.

FIG. 5 shows a flowchart 500 of a process for seamless and secure cloud to PC pointer relay, according to an embodiment. Example computing system 100 and 200, as shown by examples in FIGS. 1-3, may operate according to flowchart 500, e.g., in some embodiments. For example, example flowchart 500 may be implemented by architect server(s) 132 or cloud architect 112. Various embodiments may implement one or more steps shown in FIG. 5 with additional and/or alternative steps. Further structural and operational embodiments will be apparent to persons skilled in the relevant art(s) based on the following description of FIG. 5.

Flowchart 500 includes step 502. In step 502, search results responsive to a request for a cloud architecture may be generated. The search results may indicate at least one example cloud architectural diagram. For example, as shown in FIG. 1. For example, as shown in FIGS. 1-3, cloud architect 112 may be configured to generate a user request from information received during a user dialog with the AI. Cloud architect 112 may be configured to accumulate, parse, and combine information in the context in which it was received to formulate a cloud architecture search request. For example, a user could provide an architecture specification in a text box, by attaching a document, or by engaging in a question and answer dialog to indicate an architecture specification that forms the foundation of a search request. Cloud architect 112 may be configured to perform an architecture search of architecture knowledge using the search request. Cloud architect 112 may provide the search request in a communication 116 with architectural search engine 110. Architectural search engine 110 may use the architectural search request to search one or more indexes associated with information stored in architecture knowledge base 128 and obtain the indexed information as an architectural search result from architecture knowledge base 128 via communication 120. Cloud architect 112 may be configured to receive architecture search results from architecture search engine 110 in communication 116. Architecture search results may include a variety of information in one or more formats, e.g., text, figure information in one or more drawing file formats, and so on. Text may describe, for example, the flow of data in the diagram, various application or deployment scenarios, and so on.

In step 504, a request may be generated to a large language model (LLM) for a recommended cloud architecture based on the user request and the search results. For example, as shown in FIG. 1. For example, as shown in FIGS. 1-3, cloud architect 112 may be configured to generate an artificial intelligence (AI) request for a recommended cloud architecture based on the user request and the search results. Cloud architect 112 may be configured to arrange information within the request and results in the AI architecture request in a format expected by AI assembly 130. The AI architecture request may include the search request and search result, which may include text, diagram information (e.g., drawing files), and so on. The AI architecture request may include information about at least one architecture diagram obtained in architecture search request and/or provided by a user in architecture dialog 106. Cloud architect 112 may provide the AI architecture request to AI assembly 130 in communication 124.

In step 506, a response generated by the LLM indicating at least one recommended cloud architecture may be received. For example, as shown in FIG. 1. For example, as shown in FIGS. 1-3, cloud architect 112 may be configured to receive from AI assembly 130 in communication 124 an AI generated response indicating at least one recommended cloud architecture. The recommended cloud architecture(s) may include one or more original or modified versions of the cloud architecture(s) provided in the AI architecture request. The recommended cloud architecture(s) may be accompanied by associated text, such as data flow descriptions, successfully deployed uses, and so on.

III. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code (program instructions) configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SOC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 6:
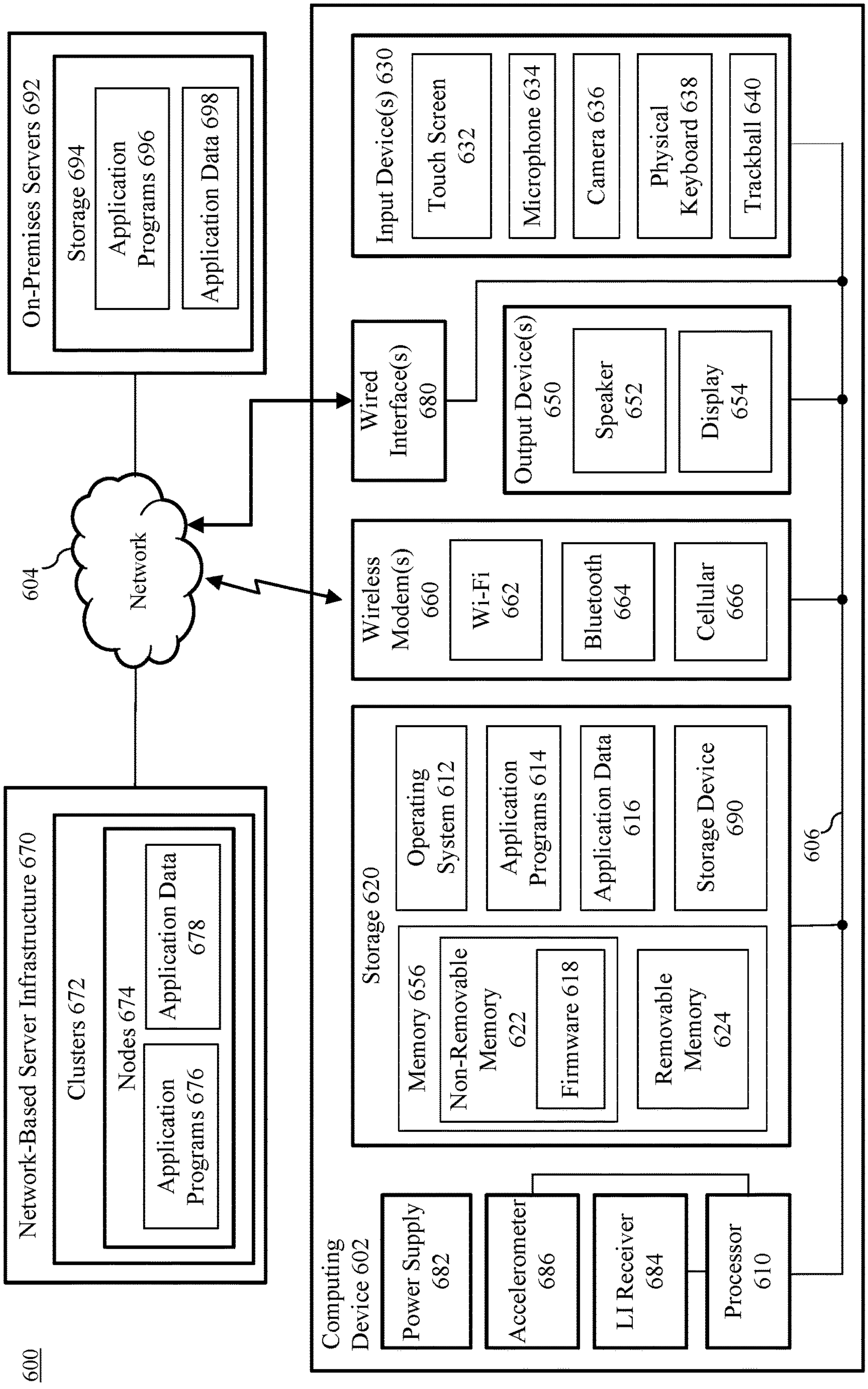
FIG. 6 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 6. FIG. 6 shows a block diagram of an exemplary computing environment 600 that includes a computing device 602. Computing device 602 is an example of user device 102, cloud server(s) 104, and architect server(s) 132 shown in FIGS. 1 and 2, which may each include one or more of the components of computing device 602. In some embodiments, computing device 602 is communicatively coupled with devices (not shown in FIG. 6) external to computing environment 600 via network 604. Network 604 comprises one or more networks such as local area networks (LANs), wide area networks (WANs), enterprise networks, the Internet, etc., and may include one or more wired and/or wireless portions. Network 604 may additionally or alternatively include a cellular network for cellular communications. Computing device 602 is described in detail as follows.

Computing device 602 can be any of a variety of types of computing devices. For example, computing device 602 may be a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. Computing device 602 may alternatively be a stationary computing device such as a desktop computer, a personal computer (PC), a stationary server device, a minicomputer, a mainframe, a supercomputer, etc.

As shown in FIG. 6, computing device 602 includes a variety of hardware and software components, including a processor 610, a storage 620, one or more input devices 630, one or more output devices 650, one or more wireless modems 660, one or more wired interfaces 680, a power supply 682, a location information (LI) receiver 684, and an accelerometer 686. Storage 620 includes memory 656, which includes non-removable memory 622 and removable memory 624, and a storage device 690. Storage 620 also stores an operating system 612, application programs 614, and application data 616. Wireless modem(s) 660 include a Wi-Fi modem 662, a Bluetooth modem 664, and a cellular modem 666. Output device(s) 650 includes a speaker 652 and a display 654. Input device(s) 630 includes a touch screen 632, a microphone 634, a camera 636, a physical keyboard 638, and a trackball 640. Not all components of computing device 602 shown in FIG. 6 are present in all embodiments, additional components not shown may be present, and any combination of the components may be present in a particular embodiment. These components of computing device 602 are described as follows.

A single processor 610 (e.g., central processing unit (CPU), microcontroller, a microprocessor, signal processor, ASIC (application specific integrated circuit), and/or other physical hardware processor circuit) or multiple processors 610 may be present in computing device 602 for performing such tasks as program execution, signal coding, data processing, input/output processing, power control, and/or other functions. Processor 610 may be a single-core or multi-core processor, and each processor core may be single-threaded or multithreaded (to provide multiple threads of execution concurrently). Processor 610 is configured to execute program code stored in a computer readable medium, such as program code of operating system 612 and application programs 614 stored in storage 620. The program code is structured to cause processor 610 to perform operations, including the processes/methods disclosed herein. Operating system 612 controls the allocation and usage of the components of computing device 602 and provides support for one or more application programs 614 (also referred to as "applications" or "apps"). Application programs 614 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Processor(s) 610 may include one or more general processors (e.g., CPUs) configured with or coupled to one or more hardware accelerators, such as one or more NPUs and/or one or more GPUs.

Any component in computing device 602 can communicate with any other component according to function, although not all connections are shown for ease of illustration. For instance, as shown in FIG. 6, bus 606 is a multiple signal line communication medium (e.g., conductive traces in silicon, metal traces along a motherboard, wires, etc.) that may be present to communicatively couple processor 610 to various other components of computing device 602, although in other embodiments, an alternative bus, further buses, and/or one or more individual signal lines may be present to communicatively couple components. Bus 606 represents one or more of any of several types of bus structures, including a memory bus or memory controller, a peripheral bus, an accelerated graphics port, and a processor or local bus using any of a variety of bus architectures.

Storage 620 is physical storage that includes one or both of memory 656 and storage device 690, which store operating system 612, application programs 614, and application data 616 according to any distribution. Non-removable memory 622 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 622 may include main memory and may be separate from or fabricated in a same integrated circuit as processor 610. As shown in FIG. 6, non-removable memory 622 stores firmware 618, which may be present to provide low-level control of hardware. Examples of firmware 618 include BIOS (Basic Input/Output System, such as on personal computers) and boot firmware (e.g., on smart phones). Removable memory 624 may be inserted into a receptacle of or otherwise coupled to computing device 602 and can be removed by a user from computing device 602. Removable memory 624 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 690 may be present that are internal and/or external to a housing of computing device 602 and may or may not be removable. Examples of storage device 690 include a hard disk drive, a SSD, a thumb drive (e.g., a USB (Universal Serial Bus) flash drive), or other physical storage device.

One or more programs may be stored in storage 620. Such programs include operating system 612, one or more application programs 614, and other program modules and program data. Examples of such application programs may include, for example, computer program logic (e.g., computer program code/instructions) for implementing architecture search engine 110, cloud architect 112, architecture deployment generator 114, architecture knowledge base 128/302, AI assembly 130/230, as well as any of flowcharts 400 and 500, and/or any individual steps thereof.

Storage 620 also stores data used and/or generated by operating system 612 and application programs 614 as application data 616. Examples of application data 616 include web pages, text, images, tables, sound files, video data, and other data, which may also be sent to and/or received from one or more network servers or other devices via one or more wired or wireless networks. Storage 620 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 602 through one or more input devices 630 and may receive information from computing device 602 through one or more output devices 650. Input device(s) 630 may include one or more of touch screen 632, microphone 634, camera 636, physical keyboard 638 and/or trackball 640 and output device(s) 650 may include one or more of speaker 652 and display 654. Each of input device(s) 630 and output device(s) 650 may be integral to computing device 602 (e.g., built into a housing of computing device 602) or external to computing device 602 (e.g., communicatively coupled wired or wirelessly to computing device 602 via wired interface(s) 680 and/or wireless modem(s) 660). Further input devices 630 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 654 may display information, as well as operating as touch screen 632 by receiving user commands and/or other information (e.g., by touch, finger gestures, virtual keyboard, etc.) as a user interface. Any number of each type of input device(s) 630 and output device(s) 650 may be present, including multiple microphones 634, multiple cameras 636, multiple speakers 652, and/or multiple displays 654.

One or more wireless modems 660 can be coupled to antenna(s) (not shown) of computing device 602 and can support two-way communications between processor 610 and devices external to computing device 602 through network 604, as would be understood to persons skilled in the relevant art(s). Wireless modem 660 is shown generically and can include a cellular modem 666 for communicating with one or more cellular networks, such as a GSM network for data and voice communications within a single cellular network, between cellular networks, or between the mobile device and a public switched telephone network (PSTN). Wireless modem 660 may also or alternatively include other radio-based modem types, such as a Bluetooth modem 664 (also referred to as a "Bluetooth device") and/or Wi-Fi modem 662 (also referred to as an "wireless adaptor"). Wi-Fi modem 662 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 664 is configured to communicate with another Bluetooth-capable device according to the Bluetooth short-range wireless technology standard(s) such as IEEE 802.15.1 and/or managed by the Bluetooth Special Interest Group (SIG).

Computing device 602 can further include power supply 682, LI receiver 684, accelerometer 686, and/or one or more wired interfaces 680. Example wired interfaces 680 include a USB port, IEEE 1394 (Fire Wire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 680 of computing device 602 provide for wired connections between computing device 602 and network 604, or between computing device 602 and one or more devices/peripherals when such devices/peripherals are external to computing device 602 (e.g., a pointing device, display 654, speaker 652, camera 636, physical keyboard 638, etc.). Power supply 682 is configured to supply power to each of the components of computing device 602 and may receive power from a battery internal to computing device 602, and/or from a power cord plugged into a power port of computing device 602 (e.g., a USB port, an A/C power port). LI receiver 684 may be used for location determination of computing device 602 and may include a satellite navigation receiver such as a Global Positioning System (GPS) receiver or may include other type of location determiner configured to determine location of computing device 602 based on received information (e.g., using cell tower triangulation, etc.). Accelerometer 686 may be present to determine an orientation of computing device 602.

Note that the illustrated components of computing device 602 are not required or all-inclusive, and fewer or greater numbers of components may be present as would be recognized by one skilled in the art. For example, computing device 602 may also include one or more of a gyroscope, barometer, proximity sensor, ambient light sensor, digital compass, etc. Processor 610 and memory 656 may be co-located in a same semiconductor device package, such as being included together in an integrated circuit chip, FPGA, or system-on-chip (SOC), optionally along with further components of computing device 602.

In embodiments, computing device 602 is configured to implement any of the above-described features of flowcharts herein. Computer program logic for performing any of the operations, steps, and/or functions described herein may be stored in storage 620 and executed by processor 610.

In some embodiments, server infrastructure 670 may be present in computing environment 600 and may be communicatively coupled with computing device 602 via network 604. Server infrastructure 670, when present, may be a network-accessible server set (e.g., a cloud-based environment or platform). As shown in FIG. 6, server infrastructure 670 includes clusters 672. Each of clusters 672 may comprise a group of one or more compute nodes and/or a group of one or more storage nodes. For example, as shown in FIG. 6, cluster 672 includes nodes 674. Each of nodes 674 are accessible via network 604 (e.g., in a "cloud-based" embodiment) to build, deploy, and manage applications and services. Any of nodes 674 may be a storage node that comprises a plurality of physical storage disks, SSDs, and/or other physical storage devices that are accessible via network 604 and are configured to store data associated with the applications and services managed by nodes 674. For example, as shown in FIG. 6, nodes 674 may store application data 678.

Each of nodes 674 may, as a compute node, comprise one or more server computers, server systems, and/or computing devices. For instance, a node 674 may include one or more of the components of computing device 602 disclosed herein. Each of nodes 674 may be configured to execute one or more software applications (or "applications") and/or services and/or manage hardware resources (e.g., processors, memory, etc.), which may be utilized by users (e.g., customers) of the network-accessible server set. For example, as shown in FIG. 6, nodes 674 may operate application programs 676. In an implementation, a node of nodes 674 may operate or comprise one or more virtual machines, with each virtual machine emulating a system architecture (e.g., an operating system), in an isolated manner, upon which applications such as application programs 676 may be executed.

In an embodiment, one or more of clusters 672 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 672 may be a datacenter in a distributed collection of datacenters. In embodiments, exemplary computing environment 600 comprises part of a cloud-based platform.

In an embodiment, computing device 602 may access application programs 676 for execution in any manner, such as by a client application and/or a browser at computing device 602.

For purposes of network (e.g., cloud) backup and data security, computing device 602 may additionally and/or alternatively synchronize copies of application programs 614 and/or application data 616 to be stored at network-based server infrastructure 670 as application programs 676 and/or application data 678. For instance, operating system 612 and/or application programs 614 may include a file hosting service client configured to synchronize applications and/or data stored in storage 620 at network-based server infrastructure 670.

In some embodiments, on-premises servers 692 may be present in computing environment 600 and may be communicatively coupled with computing device 602 via network 604. On-premises servers 692, when present, are hosted within an organization's infrastructure and, in many cases, physically onsite of a facility of that organization. On-premises servers 692 are controlled, administered, and maintained by IT (Information Technology) personnel of the organization or an IT partner to the organization. Application data 698 may be shared by on-premises servers 692 between computing devices of the organization, including computing device 602 (when part of an organization) through a local network of the organization, and/or through further networks accessible to the organization (including the Internet). Furthermore, on-premises servers 692 may serve applications such as application programs 696 to the computing devices of the organization, including computing device 602. Accordingly, on-premises servers 692 may include storage 694 (which includes one or more physical storage devices such as storage disks and/or SSDs) for storage of application programs 696 and application data 698 and may include one or more processors for execution of application programs 696. Still further, computing device 602 may be configured to synchronize copies of application programs 614 and/or application data 616 for backup storage at on-premises servers 692 as application programs 696 and/or application data 698.

Embodiments described herein may be implemented in one or more of computing device 602, network-based server infrastructure 670, and on-premises servers 692. For example, in some embodiments, computing device 602 may be used to implement systems, clients, or devices, or components/subcomponents thereof, disclosed elsewhere herein. In other embodiments, a combination of computing device 602, network-based server infrastructure 670, and/or on-premises servers 692 may be used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (micro-electronic machine) memory, nanotechnology-based storage devices, and further types of physical/tangible hardware storage media of storage 620. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 614) may be stored in storage 620. Such computer programs may also be received via wired interface(s) 680 and/or wireless modem(s) 660 over network 604. Such computer programs, when executed or loaded by an application, enable computing device 602 to implement features of embodiments discussed herein. Accordingly, such computer programs represent controllers of the computing device 602.

Embodiments are also directed to computer program products comprising computer code or instructions stored on any computer-readable medium or computer-readable storage medium. Such computer program products include the physical storage of storage 620 as well as further physical storage types.

V. Additional Example Embodiments

Systems and methods are disclosed herein for a cloud architect that provides guided support for cloud architecture design and deployment for users of all skill levels. A cloud architect combines comprehensive cloud architecture knowledge, diagramming tools, AI-powered large language model (LLM) dialog, image generation, and deployment template creation within a single platform. Generative artificial intelligence (AI) interprets user specifications to provide customized architectural solutions based on information including an architectural diagram and application scenario information, which may be stored in one or more databases. Cloud architect can deploy workloads with end-to-end support or workloads may be exported. Cloud architect automation decreases the time and expertise to migrate to cloud computing, reducing business expenses. A cloud architect enhances resource utilization and reduces waste, leading to cost savings and improved scalability without manual intervention. A cloud architect can be configured to confirm configuration accuracy, perform automated updates for cloud architectures based on updates to cloud environment (e.g., cloud infrastructure or resources), perform regulatory compliance management, perform data security, perform scaling, and/or perform optimization.

In examples, a computing system includes a cloud architect configured to generate search results responsive to a request for a cloud architecture. The search results indicate at least one example cloud architectural diagram. The cloud architect generates a request to a large language model (LLM) for a recommended cloud architecture based on the user request and the search results. The cloud architect receives a response generated by the LLM indicating at least one recommended cloud architecture.

In examples, the cloud architect is further configured to: provide the response for review in response to the user request; enable selection of a recommended cloud architectural diagram from the at least one recommended cloud architecture; and deploy a workload to a cloud using cloud resources determined based on the selected recommended cloud architectural diagram.

In examples, the cloud architect enables editing of the selected recommended cloud architectural diagram.

In examples, the cloud architect enables a dialog based on the review; receives an updated response based on the dialog; and provides the updated response for review in response to the dialog.

In examples, the cloud architect receives an edit request to edit the selected recommended cloud architectural diagram; edits (e.g., customizes) the selected recommended cloud architectural diagram response to the edit request; and provides the edited selected recommended cloud architectural diagram for review in response to the edit request.

In examples, to generate the search results, the cloud architect is configured to: search one or more indexes associated with cloud architecture information stored in an architecture knowledge base; and obtain indexed information from the architecture knowledge base as the search results. A cloud architectural diagram included in the search results includes a plurality of nodes shown interconnected in a cloud-based network.

In examples, the cloud architect provides an architecture specification based on the selected recommended cloud architectural diagram; receives a configured deployment template responsive to the architecture specification; and deploys the workload based on the configured deployment template.

In examples, the LLM is multi-modal. The cloud architect is configured to generate the at least one recommended cloud architecture and the configured deployment template in part by utilizing the multi-modal LLM. For example, a user chooses a cloud architecture diagram, a template generator receives a specification based on selected cloud architecture diagram, the template generator selects a template based on the specification, the template generator sends the template to the AI, the AI uses an LLM to configure the workload deployment template, the AI returns the configured template to the template generator, which provides the configured deployment template to the cloud architect, which presents it to the user for confirmation before deployment to the cloud using available cloud resources.

In examples, the cloud architect receives as input a cloud architectural diagram from a user device from which the user request is received and provides the received cloud architectural diagram to the LLM. The LLM may use the cloud architectural diagram received from the user in generating the at least one recommended cloud architecture.

In examples, a method may comprise generating search results responsive to a request for a cloud architecture, the search results indicating at least one example cloud architectural diagram; generating a request to a large language model (LLM) for a recommended cloud architecture based on the user request and the search results; and receiving a response generated by the LLM indicating at least one recommended cloud architecture.

In examples, the method further comprises providing the response for review in response to the user request; enabling selection of a recommended cloud architectural diagram from the at least one recommended cloud architecture; and deploying a workload to a cloud using cloud resources determined based on the selected recommended cloud architectural diagram.

In examples, the method may further comprise enabling editing of the selected recommended cloud architectural diagram.

In examples, the method may further comprise enabling a dialog based on the review; receiving an updated response based on the dialog; and providing the updated response for review in response to the dialog.

In examples, the method may further comprise receiving an edit request to edit the selected recommended cloud architectural diagram; editing the selected recommended cloud architectural diagram response to the edit request; and providing the edited selected recommended cloud architectural diagram for review in response to the edit request.

In examples, the generating of the search results comprises searching one or more indexes associated with cloud architecture information stored in an architecture knowledge base; and obtaining indexed information from the architecture knowledge base as the search results. A cloud architectural diagram included in the search results includes a plurality of nodes shown interconnected in a cloud-based network.

In examples, the method may further comprise providing an architecture specification based on the selected recommended cloud architectural diagram; receiving a configured deployment template responsive to the architecture specification; and deploying the workload based on the configured deployment template.

In examples, a computer-readable storage device may have instructions recorded thereon that, when executed by a processor, implement a method. The method may comprise generating search results responsive to a request for a cloud architecture, the search results indicating at least one example cloud architectural diagram; generating a request to a large language model (LLM) for a recommended cloud architecture based on the user request and the search results; receiving a response generated by the LLM indicating at least one recommended cloud architecture; and providing the response for review in response to the user request.

In examples, the method may further comprise enabling selection of a recommended cloud architectural diagram from the at least one recommended cloud architecture, and deploying a workload to a cloud using cloud resources determined based on the selected recommended cloud architectural diagram.

In examples, the method may further comprise enabling editing of the selected recommended cloud architectural diagram.

In examples, the method may further comprise generating the user request from information received during a user dialog.

VI. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, computing devices, servers, device management services, virtual machine provisioners, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (e.g., or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (e.g., computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A computing system, comprising:

a cloud architect configured to:

generate search results responsive to a search request for a cloud architecture, the search results indicating at least one example cloud architectural diagram that includes a plurality of nodes shown interconnected in a cloud-based network;

generate a recommendation request to a large language model (LLM) for a recommended cloud architecture based on the search request and the search results, wherein the recommendation request comprises at least the one example cloud architecture diagram;

receive a response generated by the LLM indicating at least one recommended cloud architecture; and deploy a workload to a cloud using cloud resources determined based on the selected recommended cloud architectural diagram.

2. The computing system of claim 1, wherein the cloud architect is further configured to:

provide the response for review in response to the search request; and enable selection of a recommended cloud architectural diagram from the at least one recommended cloud architecture.

3. The computing system of claim 2, wherein the cloud architect is further configured to:

enable editing of the selected recommended cloud architectural diagram.

4. The computing system of claim 2, wherein the cloud architect is further configured to:

enable a dialog based on the review;

receive an updated response based on the dialog; and provide the updated response for review in response to the dialog.

5. The computing system of claim 2, wherein the cloud architect is further configured to:

receive an edit request to edit the selected recommended cloud architectural diagram;

edit the selected recommended cloud architectural diagram in response to the edit request; and provide the edited selected recommended cloud architectural diagram for review in response to the edit request.

6. The computing system of claim 1, wherein to generate the search results, the cloud architect is configured to:

search one or more indexes associated with cloud architecture information stored in an architecture knowledge base; and obtain indexed information from the architecture knowledge base as the search results; and wherein a cloud architectural diagram included in the search results includes a plurality of nodes shown interconnected in a cloud-based network.

7. The computing system of claim 3, wherein the cloud architect is further configured to:

provide an architecture specification based on the selected recommended cloud architectural diagram;

receive a configured deployment template responsive to the architecture specification; and deploy the workload based on the configured deployment template.

8. The computing system of claim 7, wherein the LLM is multi-modal and configured to generate the at least one recommended cloud architecture and the configured deployment template.

9. The computing system of claim 7, wherein the cloud architect is further configured to:

receive, as input, a second cloud architectural diagram from a user device from which the search request is received; and provide the second cloud architectural diagram to the LLM.

10. A method, comprising:

generating search results responsive to a search request for a cloud architecture, the search results indicating at least one example cloud architectural diagram that includes a plurality of nodes shown interconnected in a cloud-based network;

generating a recommendation request to a large language model (LLM) for a recommended cloud architecture based on the search request and the search results, wherein the recommendation request comprises at least the one example cloud architecture diagram;

receiving a response generated by the LLM indicating at least one recommended cloud architecture; and deploying a workload to a cloud using cloud resources determined based on the selected recommended cloud architectural diagram.

11. The method of claim 10, further comprising:

providing the response for review in response to the search request; and enabling selection of a recommended cloud architectural diagram from the at least one recommended cloud architecture.

12. The method of claim 11, further comprising:

enabling editing of the selected recommended cloud architectural diagram.

13. The method of claim 11, further comprising:

enabling a dialog based on the review;

receiving an updated response based on the dialog; and providing the updated response for review in response to the dialog.

14. The method of claim 11, further comprising:

receiving an edit request to edit the selected recommended cloud architectural diagram;

editing the selected recommended cloud architectural diagram response to the edit request; and providing the edited selected recommended cloud architectural diagram for review in response to the edit request.

15. The method of claim 12, further comprising:

providing an architecture specification based on the selected recommended cloud architectural diagram;

receiving a configured deployment template responsive to the architecture specification; and deploying the workload based on the configured deployment template.

16. The method of claim 10, wherein said generating search results comprises:

searching one or more indexes associated with cloud architecture information stored in an architecture knowledge base; and obtaining indexed information from the architecture knowledge base as the search results; and wherein a cloud architectural diagram included in the search results includes a plurality of nodes shown interconnected in a cloud-based network.

17. A computer-readable storage device having instructions recorded thereon that, when executed by a processor, implements a method comprising:

generating search results responsive to a search request for a cloud architecture, the search results indicating at least one example cloud architectural diagram that includes a plurality of nodes shown interconnected in a cloud-based network;

generating a recommendation request to a large language model (LLM) for a recommended cloud architecture based on the search request and the search results, wherein the recommendation request comprises at least the one example cloud architecture diagram;

receiving a response generated by the LLM indicating at least one recommended cloud architecture;

providing the response for review in response to the search request; and deploying a workload to a cloud using cloud resources determined based on the selected recommended cloud architectural diagram.

18. The computer-readable storage device of claim 17, the method further comprising:

enabling selection of a recommended cloud architectural diagram from the at least one recommended cloud architecture.

19. The computer-readable storage device of claim 18, the method further comprising:

enabling editing of the selected recommended cloud architectural diagram.

20. The computer-readable storage device of claim 17, the method further comprising:

generating the search request from information received during a user dialog.

* * * * *